United States Patent
Hall

(10) Patent No.: US 7,103,316 B1
(45) Date of Patent: Sep. 5, 2006

(54) METHOD AND APPARATUS DETERMINING THE PRESENCE OF INTERFERENCE IN A WIRELESS COMMUNICATION CHANNEL

(75) Inventor: Steven Deane Hall, Encinitas, CA (US)

(73) Assignee: RFMD WPAN, Inc., San Diego, CA (US)

( * ) Notice: Subject to any disclaimer, the term of this patent is extended or adjusted under 35 U.S.C. 154(b) by 340 days.

(21) Appl. No.: 10/673,110

(22) Filed: Sep. 25, 2003

(51) Int. Cl.
H04B 1/00 (2006.01)

(52) U.S. Cl. ............... 455/63.1; 455/67.13; 455/226.2; 455/226.3

(58) Field of Classification Search ............... 455/63.1, 455/67.11, 67.13, 115.1, 226.1, 226.2, 226.3; 375/227
See application file for complete search history.

(56) References Cited

U.S. PATENT DOCUMENTS

| | | | | |
|---|---|---|---|---|
| 5,325,204 A * | 6/1994 | Scarpa | .................... | 348/607 |
| 5,715,282 A * | 2/1998 | Mansouri et al. | ........... | 375/350 |
| 6,355,537 B1 | 3/2002 | Seefeldt | ...................... | 438/405 |
| 6,366,622 B1 | 4/2002 | Brown et al. | ............... | 375/322 |
| 6,374,096 B1 * | 4/2002 | Parr | ...................... | 455/226.1 |
| 6,570,446 B1 | 5/2003 | Ling | ......................... | 330/252 |
| 6,647,077 B1 | 11/2003 | Shan et al. | ................ | 375/346 |
| 6,661,834 B1 | 12/2003 | Shan et al. | ................ | 375/147 |
| 6,670,914 B1 | 12/2003 | Najarian et al. | ........ | 342/357.06 |
| 6,674,818 B1 | 1/2004 | King et al. | ................. | 375/343 |
| 6,680,652 B1 | 1/2004 | Hoheisel et al. | ........... | 330/302 |
| 6,693,468 B1 | 2/2004 | Humphreys et al. | ....... | 327/105 |
| 6,693,954 B1 | 2/2004 | King et al. | ................. | 375/147 |
| 6,700,929 B1 | 3/2004 | Shan et al. | ................. | 375/224 |
| 6,728,324 B1 | 4/2004 | Shan et al. | ................. | 375/346 |
| 2002/0136268 A1 | 9/2002 | Gan et al. | ................... | 375/133 |
| 2003/0022645 A1 * | 1/2003 | Runzo | ..................... | 455/226.2 |
| 2003/0040277 A1 * | 2/2003 | Deats | ......................... | 455/63 |

* cited by examiner

Primary Examiner—Eliseo Ramos-Feliciano
Assistant Examiner—Anthony S. Addy
(74) Attorney, Agent, or Firm—Withrow & Terranova, PLLC

(57) ABSTRACT

A method and apparatus for estimating the presence of RF interference in a wireless data channel is described. The method and apparatus comprises a set of identical tracking/register (T/R) filter blocks, each T/R filter block associated and corresponding to an RF channel of interest. Each T/R filter block includes a pair of tracking/register (T/R) filters. Power/magnitude estimates from an RSSI calculation are input to the T/R filter blocks. One T/R filter is used to estimate the noise floor (in the absence of interference). The T/R filter latches and filters the lowest input values received from a power/magnitude circuit. The other T/R filter estimates the level of an interferer, if present, by latching and filtering the largest valued outputs of the power/magnitude circuit.

46 Claims, 14 Drawing Sheets

METHOD AND APPARATUS DETERMINING THE PRESENCE OF INTERFERENCE IN A WIRELESS COMMUNICATION CHANNEL

CROSS-REFERENCE TO-RELATED APPLICATIONS

This invention is related to commonly-assigned co-pending application Ser. No. 10/216,082, filed Aug. $8^{th}$, 2002, entitled "Method and Apparatus for a Dual-Mode Radio in a Wireless Communication System"; and commonly-assigned co-pending application Ser. No. 10/235,090, filed Sep. $3^{rd}$, 2002, entitled "Method and Apparatus Implementing an Overlay Adaptive Frequency Hopping Kernel in a Wireless Communication System". Both of the related applications are hereby incorporated by reference herein in their entirety and referred to hereafter as "the related applications".

BACKGROUND

1. Field of the Invention

This invention relates to the field of wireless communication systems, and more particularly to the field of detecting interference in wireless communication channels.

2. Description of Related Art

As is well known in the wireless data communications arts, a common trade-off in the design of communication systems is performance versus bandwidth. That is, various aspects of communication performance can be improved at the expense of increased radio frequency (RF) bandwidth. One very important factor contributing to the performance of a communication system is the "quality" of the data channels used by the system. As is well known, data reception errors can be caused by the introduction of noise and interference during data transmissions across a channel. Signal interference distorts signals and their associated data during transmissions over the channel. Sources of such noise and interference comprise radio-frequency interference (RFI) including multi-path fading, multiple-access interference and hostile jamming. Channel quality depends largely on the amount of noise and interference that exists on a channel relative to the strength of the signal levels of the channel. A channel that has a small amount of noise relative to the strength of the signals is a high channel quality. Conversely, a channel that has a large amount of noise relative to the signal levels is a low channel quality. Channel quality is typically measured in terms of the signal-to-noise (SNR) or $E_s/N_o$ (i.e., ratio of signal energy to noise energy) of a channel.

A wireless communication system can be properly designed to reliably operate in the presence of various types of noise and radio-frequency interference. For example, signals with very large RF bandwidths can be generated using a well-known method known as adaptive frequency hopping (AFH) in which the carrier frequency of a digital communication signal is adaptively changed, or "hopped", over a wide range of frequencies. One such AFH digital communication system is the Bluetooth™ protocol system that facilitates the transport of data between Bluetooth™ devices. As described in more detail in the above-incorporated related applications, Bluetooth™ communication systems use a frequency-hopping spread spectrum (FHSS) scheme when communicating between master and slave devices. In accordance with this frequency hopping spread spectrum scheme, frequencies are switched during data transmissions. Frequency hopping is performed in accordance with specified frequency-hopping algorithms so that devices can independently determine the correct frequency-hopping sequences (i.e., ordered lists of frequencies, also sometimes referred to as "hop-sets"). In one example, pseudo-random FH sequences are independently determined by slave devices using their associated master device address and clock information.

Although the FH sequences associated with each Bluetooth™ master device is unique, piconets operating within close proximity can interfere with one another due to the relatively small number of independent channels used by the Bluetooth™ devices. In addition, channel noise and interference can be caused by a number of non-Bluetooth™ devices operating within close proximity to the Bluetooth™ devices. For example, as described in the above-incorporated related applications, an 802.11 protocol device operating within close proximity to a Bluetooth™ device can cause undesirable RF interference rendering one or more of the channels in the Bluetooth™ device's hop-set unusable.

The FHSS scheme reduces collisions between nearby Bluetooth™ piconets due to the pseudo-random nature of the FH sequence used by the devices. As described in Part B, "Baseband Specification," Section 11, of the Bluetooth™ Specification, Bluetooth™ communication protocols use a Bluetooth™ FH kernel to select FH sequences and map FH sequences to hop frequencies. Disadvantageously, the Bluetooth™ FH kernel selects hopping frequencies without regard to channel conditions, and thus, a hopping frequency having bad channel conditions (e.g., exhibiting small signal-to-noise ratios) caused by non-Bluetooth™ (FH) interferers can be selected. As is well known, transmitting data on frequencies with bad channel conditions increases the probability of the occurrence of reception errors. In any data communication system, it is desirable to reduce the occurrence of reception errors.

Therefore, a need exists for a method and apparatus that estimates and detects the presence of RF interference on a data channel. The data channel may have been previously determined by an AFH scheme to be "disallowed" (i.e., exhibited bad channel conditions), or it may be a channel within a frequency hop-set. The interference detection apparatus and method should be amenable for use in any communication system where the presence of intermittent interference needs to be detected. The present invention provides such a method and apparatus.

SUMMARY OF THE INVENTION

The present invention relates to a method and apparatus for estimating the presence of RF interference in a wireless data channel. In one embodiment, the present method and apparatus comprises a set of identical tracking/register (T/R) filter blocks, each T/R filter block associated and corresponding to a data channel of interest. In one embodiment, each inventive T/R filter block includes a pair of tracking/register (T/R) filters. One of the T/R filters is used for tracking noise in the data channel. The other T/R filter is used to track interference in the data channel. In one embodiment, in order to reduce the complexity of the inventive circuit, a single circuit is used and the contents of the filter registers are saved in a memory.

Power or magnitude estimates from an RSSI calculation are input to the T/R filter blocks. One T/R filter is used to estimate the noise floor (in the absence of interference). The T/R filter latches and filters the lowest input values received from a power/magnitude circuit. The other T/R filter estimates the level of an interferer, if present, by latching and filtering the largest valued outputs of the power/magnitude circuit. In one embodiment, an optional duty cycle estimation filter may be used in implementing the T/R filter blocks. The optional duty cycle estimation filter generates an estimate of the probability of an interferer being present on a channel based on the observation samples. The optional filter compares the input power/magnitude with the contents of the low value T/R filters and/or the high value filters and makes a decision as to whether an interferer is present on the channel. Based on this decision, either a numerical value of one or zero is input to an integrator that produces an estimate of the probability (fractional frequency) of interference occurring on the data channel.

An embodiment of the present invention is described wherein the invention uses an average noise estimation block. The average noise estimation block produces both arithmetic and weighted averages of the noise estimates maintained by all of the T/R filter blocks. The noise average is improved by rejecting noise estimates that are too high and are therefore likely the result of channels having continuous interference. Both the arithmetic and weighted averages are output by the average noise estimation block as an average noise estimate. The average noise estimate is used by an interference present decision block to determine if interference is present in a selected RF channel. In one embodiment, the interference level stored in the T/R filter corresponding to the selected RF channel is compared to a scaled average noise estimate. If the interference level of the selected RF channel is greater than the scaled average noise estimate, interference is determined to be present on the selected RF channel. Else, interference is determined to be absent form the selected RF channel.

Another embodiment of the present invention does not compare the interference levels to a noise average. In this embodiment, no average noise calculation is required. Rather, the interference level stored in the selected T/R filter (corresponding to the selected RF channel) is compared to a scaled version of the noise level stored in the T/R filter. If the interference level of the selected channel is greater than or equal to the scaled noise level of the selected channel, interference is determined to be present on the selected RF channel. Else, interference is determined to be absent from the selected RF channel. In some embodiments the noise level is scaled by a factor of one (i.e., the interference level is compared to the noise level of the selected channel). In other embodiments, the noise level is scaled using any convenient scale factor.

In one embodiment of the present inventive RF interference detection method and apparatus, an observation accelerator is used to accelerate the noise and interference data sampling process. The observation accelerator produces an estimate of whether or not a channel has an interferer present and counts the number of times this occurs. Observation of the channel stops when either of two events occurs. If the number of interference hits reaches a predetermined threshold level, or if the total number of observations reaches a predetermined threshold level, the observation of the channel stops. The observation accelerator thereby shortens the overall observation process by ensuring that a channel is observed for a duration that is sufficient to obtain a reasonable estimate of interference levels. In practice, only a few interference samples are required.

BRIEF DESCRIPTION OF THE DRAWINGS

Like reference numbers and designations in the various drawings indicate like elements.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1:
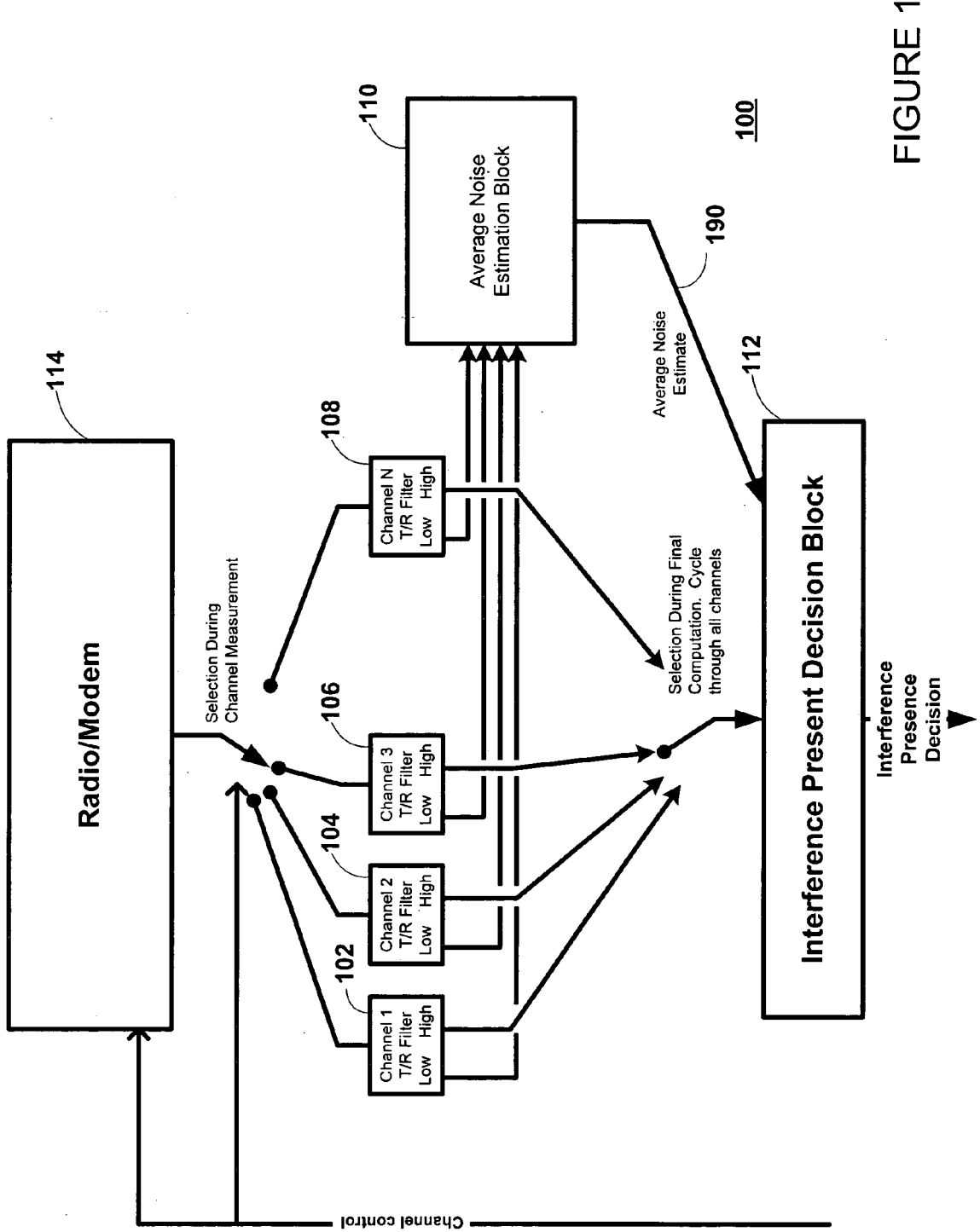
FIG. 1 is a simplified high-level block diagram showing one embodiment of an interference estimation apparatus made in accordance with the present invention.
Figure 2:
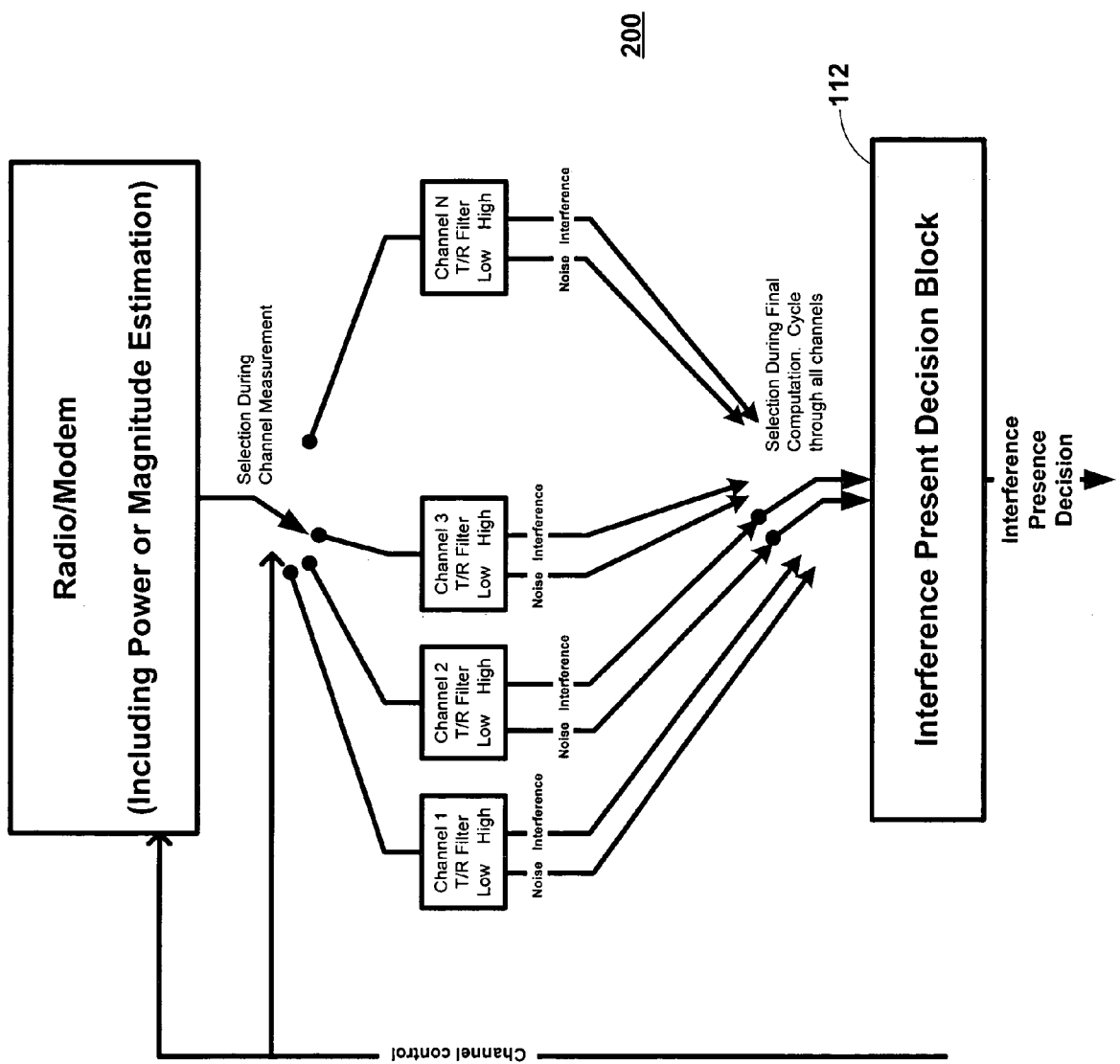
FIG. 2 is a simplified high-level block diagram showing another embodiment of an interference estimation apparatus made in accordance with the present invention.

FIGS. 1 and 2 are simplified high-level block diagrams showing interference estimation apparatus made in accordance with the present invention. As shown in FIG. 1, in one embodiment, the inventive interference estimation apparatus 100 includes a plurality of tracking register (T/R) filter blocks for each channel- to be monitored by the apparatus 100 (e.g., Channel 1 T/R filter 102, T/R filter 104, etc). As described below in more detail, the T/R filter blocks measure noise and interference levels for each associated and corresponding data channel. Each T/R filter block includes both a "high" T/R filter that tracks the interference in the associated channel and a "low" T/R filter that tracks the noise in the associated channel. In one embodiment, each T/R filter block optionally includes a duty cycle estimation filter for each channel. In the embodiment shown in FIG. 1, the interference estimation apparatus 100 also includes an average noise estimation block 110 that accepts the various channels' noise estimates and produces an average noise estimate. The interference estimation apparatus 100 also includes an interference present decision block 112 operatively coupled to outputs of the plurality of T/R filter blocks and the average noise estimation block 110. The interference present decision block 112 produces an "interference present" decision for a selected channel. The interference present decision is based upon noise estimates (provided by the plurality of T/R filter blocks) and an interference estimate for the selected channel.

In one embodiment, the present inventive interference estimation and detection apparatus generates an estimate of the presence of interference in a channel as part of a "bad channel" assessment algorithm. In accordance with the present teachings, the bad channel assessment algorithm has two phases: 1) observation/data collection, and 2) decision making based on the observations and data collected in the first phase. Data are collected for each channel of interest and interference decisions are made for each channel. In some embodiments, after the decision making phase is completed, additional intermittent observations/data collection phases may be performed, followed by another decision making phase. The additional observations/data collection and decision making phases ensure that the decisions for each channel are current. In these embodiments, channels that in one instance were determined to have good quality can be updated as having an interferer when interference is newly detected in the channel. Similarly, channels that once were determined to have interference can be updated as having good quality whenever the interferer ceases.

During the data collection phase, the radio/modem 114 is tuned to the channel to be measured. Measurement takes place when no desired signal is present. The modem 114 produces a received signal strength indication (RSSI) measurement that is used in one embodiment to practice the present invention. The exact nature of the RSSI measurement is not important as long as the measurement is proportional to received power or magnitude. Some metrics produce improved system performance, however, it will be appreciated by those skilled in the wireless communications arts that the present inventive apparatus functions with a number of metrics.

In one embodiment, an estimate is produced based on the in-phase (I) and quadrature (Q) outputs of an analog-to-digital (A/D) converter. One such A/D converter comprises a Delta Sigma Modulator. The metric is shown as follows:

$$\text{Metric} = \sum_N \left( \max(|I|, |Q|) + \frac{1}{2}\min(|I|, |Q|) \right).$$

Another metric that provides similar performance to the metric given above is given as follows:

$$\text{Metric} = \sum_N \sqrt{I^2 + Q^2}$$

These metrics provide a magnitude estimate of the input. Power estimates would work as well such as the following power metric:

$$\text{Metric} = \sum_N (I^2 + Q^2),$$

where N is the number of samples taken during the observation. Increasing the value of N improves the performance of the measurement algorithm but at the cost of longer time for observation, thus slowing the interference decision process, and increasing overall power consumption because the system is on for a longer period of time.

Figure 3:
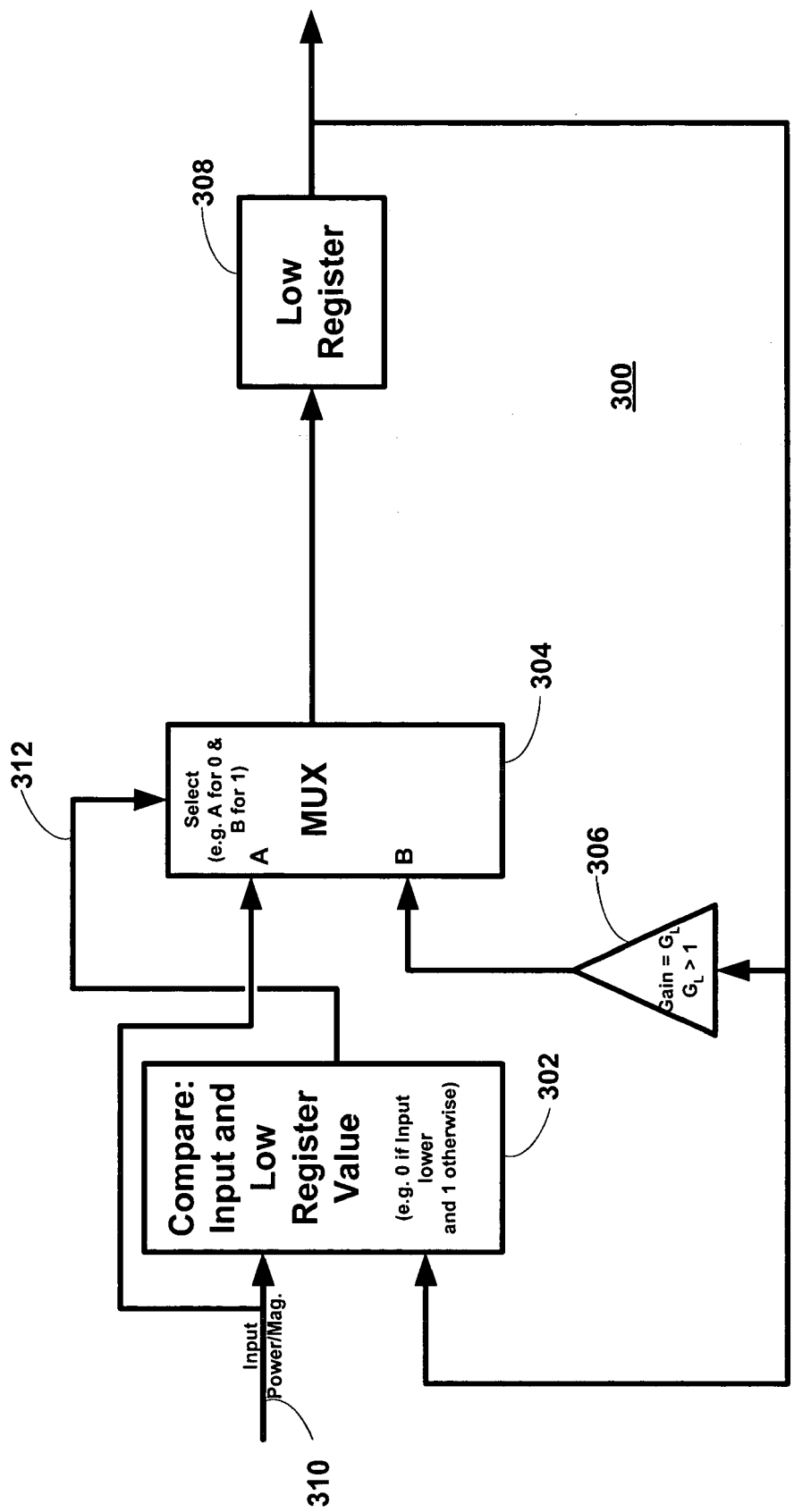
FIG. 3 is a block diagram of a first embodiment of a Low Value T/R filter used to track channel noise.
Figure 4:
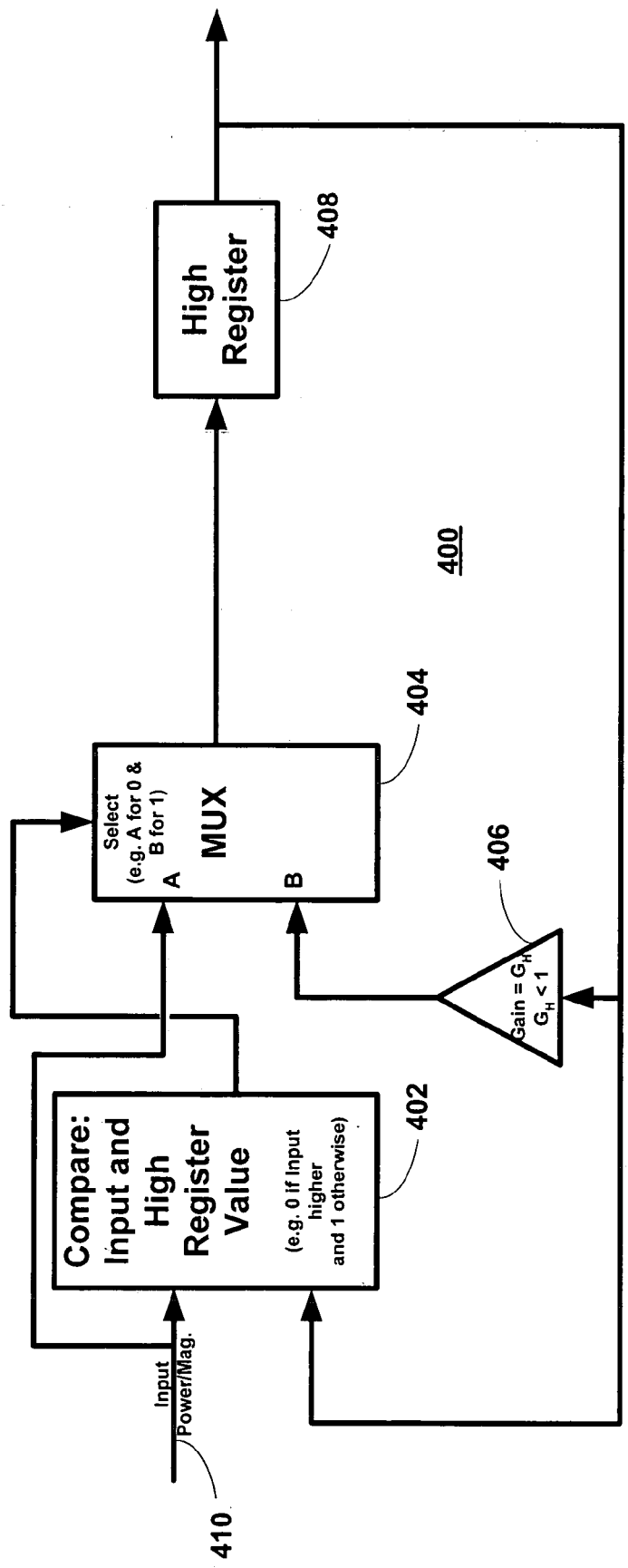
FIG. 4 is a block diagram of a first embodiment of a High Value T/R filter used to track channel interference.
Figure 5:
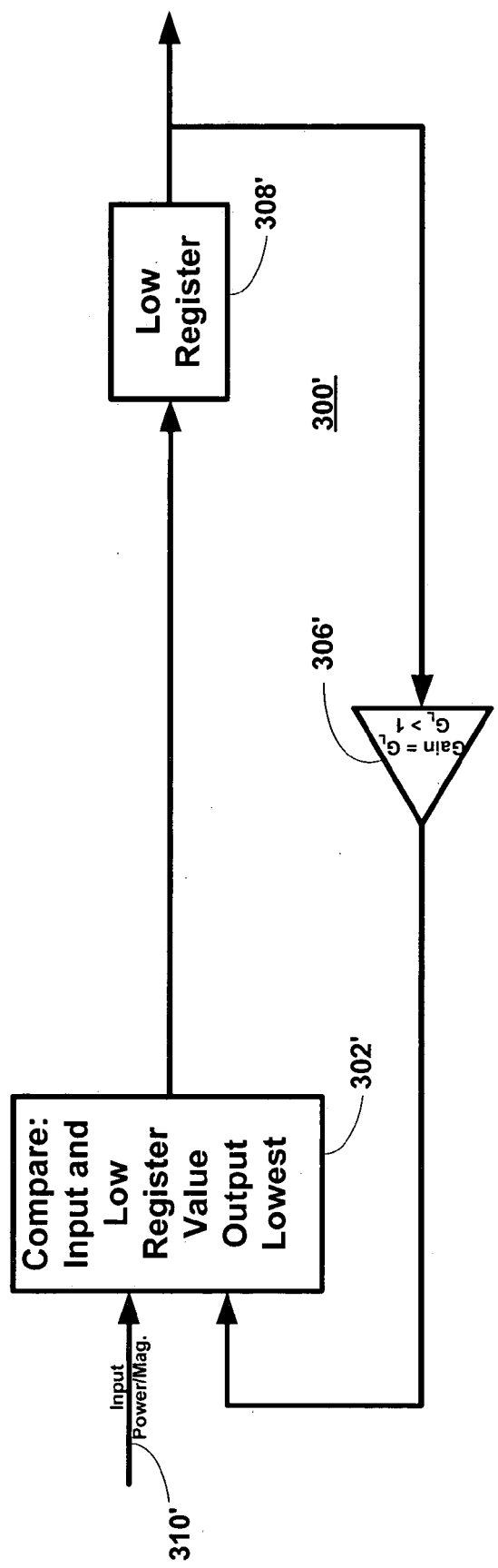
FIG. 5 is a block diagram of a second embodiment of a Low Value T/R filter used to track channel noise.
Figure 6:
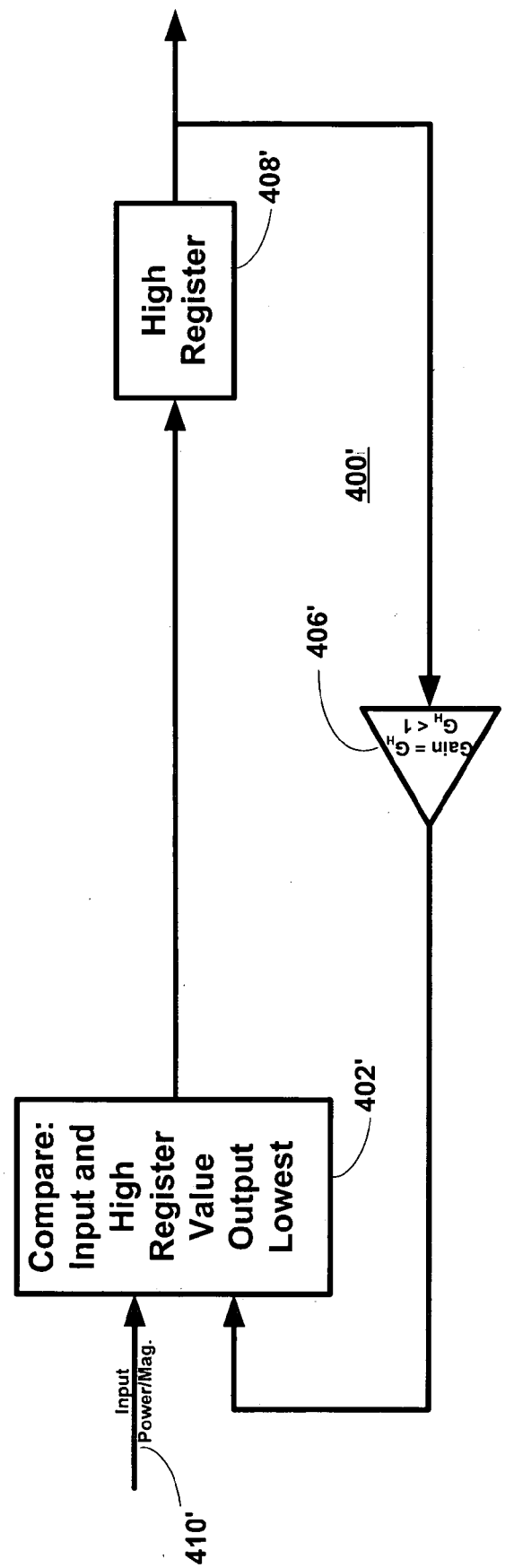
FIG. 6 is a block diagram of a second embodiment of a High Value T/R filter used to track channel interference.

The selected metrics are input to the T/R filter blocks during the observation/data collection phase of the bad channel assessment algorithm. FIGS. 3–6 show details of two embodiments of the T/R filter blocks shown in FIGS. 1 and 2. More specifically, FIG. 3 shows a first embodiment of a Low Value T/R filter 300 used to track channel noise. FIG. 4 shows a first embodiment of a High Value T/R filter 400 used to track channel interference. Similarly, FIG. 5 shows a second embodiment of a Low Value T/R filter 300' used to track channel noise. FIG. 6 shows a second embodiment of a High Value T/R filter 400' used to track channel interference. In one embodiment, as shown in FIGS. 3–6, the T/R filters are implemented using dedicated logic for each channel. In another embodiment (not shown), the comparison and scaling logic is shared between the channels and only the registers (e.g., the "low" and "high" registers) are dedicated for a channel. For each of the implementations shown in FIGS. 3–6, the registers (e.g., the "low" and "high" registers) are loaded with a sample value (i.e. a first input value).

FIG. 3 is a block diagram showing a first embodiment of the Low Value T/R filter 300 used to track noise in a channel. As shown in FIG. 3, the Low Value T/R filter 300 includes a comparator block 302, a 2-to-1 multiplexer 304, an amplifier 306 and a Low Register 308. The Low Value T/R filter 300 functions as follows. As noted above, on the first pass, the Low Register 308 is loaded with the first Input Power/Magnitude value that is output by the Radio/Modem 114 (FIGS. 1 and 2) during the observation/data collection phase. After this pass, the next observation metric at the input 310 is compared with the value in the Low Register 308. If the observation metric (also referred to herein as the "sample") is lower than the registered value, the comparator block 302 outputs a logical zero, else it outputs a logical one. This output is coupled to a multiplexer select line 312 as shown. Therefore, when the metric is lower than the registered value, the observation metric is loaded into the Low Register 308 (input "A" of the multiplexer 304 is selected). If the sample is greater than or equal to the previous Low registered value, a scaled version of the previous registered value is loaded into the Low register 308 (i.e., input "B" of the multiplexer 304 is selected). The scale factor provided by the amplifier 306 is selected to be slightly greater than one. Over time, the contents of the Low register 308 will tend to increase gradually until a lower noise sample is measured. This ensures that the low value estimate stored in the Low Register 308 will not become stuck on an abnormally low value.

In one embodiment, the scale factor provided by the amplifier 306 is of the form $1+\frac{1}{2}^K$. In this embodiment, the scaling function can be implemented using a shifter and an adder (not shown). In this implementation, the value is added to a version of itself that has been shifted to the right by "K" bit positions (equivalent to dividing by $2^K$). Varying the scale factor value controls the amount of decay in the Low Register value. By varying the scale factor, the smoothness of the estimate can be traded off for faster reaction time to changes in the operational environment.

FIG. 4 is a block diagram of a first embodiment of the High Value T/R filter 400 used to track interference in a channel. As shown in FIG. 4, the High Value T/R filter 400 includes a comparator block 402, a 2-to-1 multiplexer 404, an amplifier 406 and a High Register 408. As noted above, on a first pass, the High Register 408 is loaded with the first Input Power/Magnitude value that is output by the Radio/Modem 114 (FIGS. 1 and 2) during the observation/data collection phase. After this pass, the next observation metric at the input 410 is compared with the value in the High Register 408.

The High Value T/R filter 400 operates essentially the same as the Low Value T/R filter 300 of FIG. 3 with two differences. First the comparison performed by the comparator block 402 is such that if the sample input value is higher than the previously registered value (the value previously loaded into the High Register 408), it is loaded into the High Register 408 (as opposed to the lower sample input value being loaded into the Register as performed by the circuit 300 of FIG. 3). Secondly, in one embodiment, the scale factor provided by the amplifier 406 is slightly less than one (as opposed to being slightly greater than one) and is preferably of the form $1-\frac{1}{2}^K$. Over time, the contents of the High Register 408 will tend to gradually decrease until a larger interferer input is measured. If the level of interference drops this feature allows the interference estimate to rapidly detect the change.

FIGS. 5 and 6 show alternative embodiments of the T/R filters of FIGS. 3 and 4. FIG. 5 shows an alternative embodiment of the Low Value T/R filter 300' (used to track noise in a channel), and FIG. 6 shows an alternative embodiment of the High Value T/R filter 400' (used to track interference in a channel). The implementations of FIGS. 5 and 6 have somewhat reduced circuit complexity as compared with their counterparts of FIGS. 3 and 4. The probability of declaring that interference is present in noise only channels is slightly higher using the alternative embodiments of FIGS. 5 and 6. As shown in FIG. 5, the Low Value T/R filter 300' includes a comparator block 302', an amplifier 306' and a Low Register 308'. The sample provided at the input line 310' is compared to a scaled version of the register contents and the lower value is loaded back into the Low register 308'. The selection of scale factor provided by the amplifier 306' is the same as that used in the embodiment shown in FIG. 3. As shown in FIG. 6, the High Value T/R filter 400' includes a comparator block 402', an amplifier 406' and a High Register 408'. The embodiment shown in FIG. 6 operates similarly to that of FIG. 5, with the exception that the scale factor provided by the amplifier 406' is less than one, and the greater value of the input at the input line 410' and scaled previous value is loaded into the High register 408'.

Figure 7:
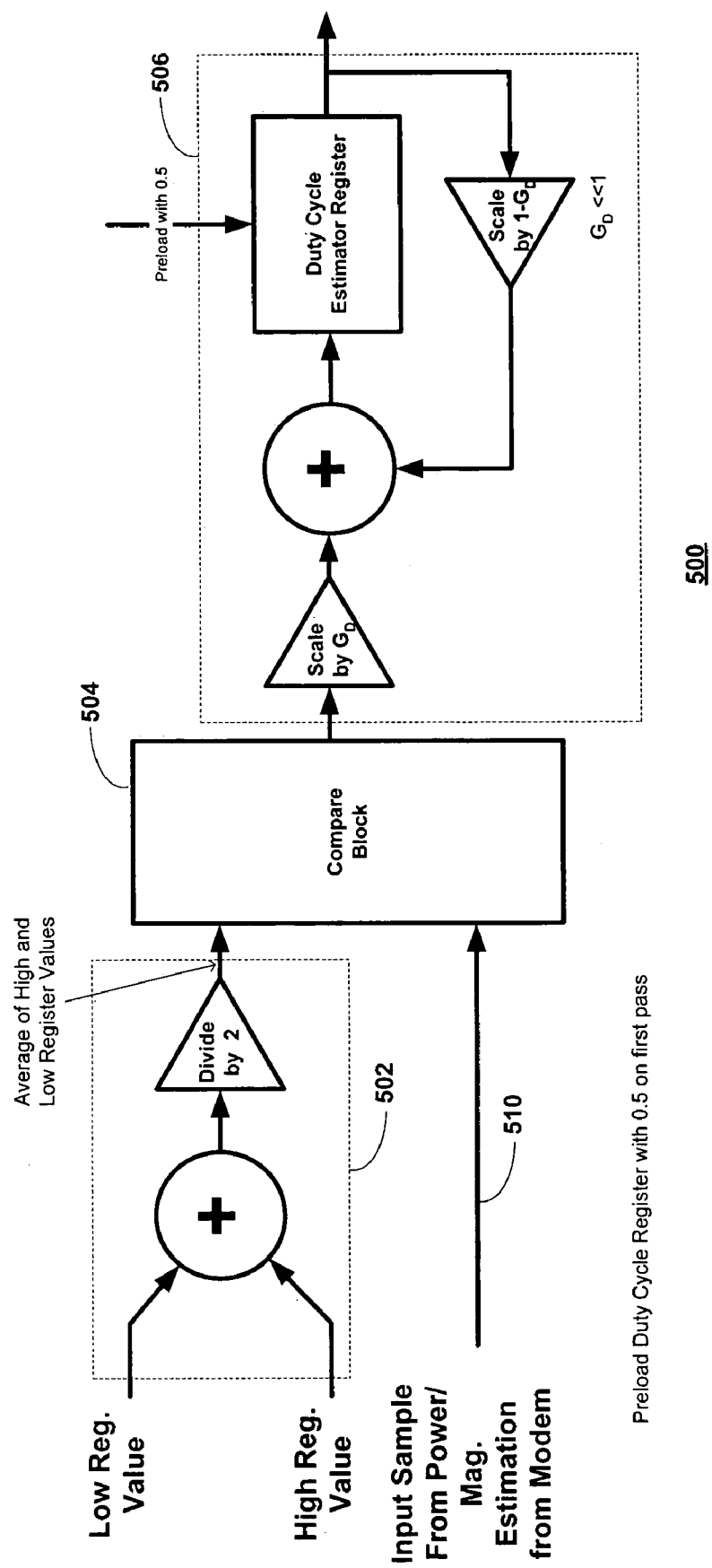
FIG. 7 is a block diagram of an optional duty cycle estimation filter that may be used in implementing the T/R filter blocks shown in the embodiments of FIGS. 1 and 2.

Each T/R filter block may optionally include the duty cycle estimation filter 500 shown in FIG. 7. As described below in more detail, the duty cycle estimation filter 500 generates an estimate of the probability of an interferer being present at a certain channel based on the observation samples. The duty cycle estimation filter 500 is an optional block, as the present inventive interference estimation and detection apparatus can estimate the presence of interference without it. However, in some instances, if the probability is sufficiently low, the AFH algorithm may opt not to disallow a channel even though interference is present.

As shown in FIG. 7, the cycle estimator 500 includes three basic blocks. Specifically, the cycle estimator 500 includes an averaging block 502, a comparator block 504 and a filtering block (integration block) 506. The averaging block 502 computes the average of the high and low register contents (e.g., the average of the contents of noise register 308 and interference register 408 over several observations).

The average computed by the averaging block 502 serves as a threshold for determining whether or not an interferer is present on a channel. In some embodiments, the averaging block computes the average by totaling the low and high register contents, and dividing the total by two. In other embodiments, the averaging block 502 computes a weighted average of the noise and interference measurements. Alternatively, a scaled version of the noise estimate is calculated by the averaging block 502. The average computed by the averaging block 502 is input to the comparator block 504. The average is compared with an input sample which is input to the comparator block over input line 510. If the input is larger than the computed average, the comparator block 504 outputs a value representing one, otherwise it outputs a value representing zero. The output of the comparator block 504 is input to the filtering block 506.

As shown in FIG. 7, in one embodiment the filtering block 506 can be implemented as a "leaky integrator". As is well known to those skilled in the art of communications systems design, a "leaky integrator" comprises a low pass filter having unity gain at DC. It is commonly used because of its simple implementation. As shown in the embodiment of FIG. 7, the input is scaled by $G_0$ and summed with the output of an accumulator scaled by $(1-G_0)$. Typically $G_0$ is selected to be of the form $(\frac{1}{2})^K$ (where K is an integer) so that scaling can be performed via an arithmetic shift of the input sample. Scaling the accumulator output by $(1-G_0)$ is easily implemented by subtracting the $G_0$-scaled version of the accumulator output from the accumulator output. In another embodiment, scaling of the input sample can be eliminated from the filtering block 506 by having the compare block 504 output a value representing $G_0$, instead of a value representing one. The output of the leaky integrator is approximately equal to the probability that an interferer is present on the channel.

In practice, although interference levels can change dramatically, noise levels do not vary much over time. It is therefore possible to reuse noise level estimates from observation period to observation period. Alternatively, the noise registers can be loaded with a noise average taken from all of the data channels. Reuse of noise level estimates, or use of average noise levels, enables acceleration of the observation process. By reusing noise level estimates, there is no need to collect additional samples for the noise estimate used in the decision making phase of the bad channel assessment algorithm. Thus, when a predetermined number of interference samples are detected, the observation of that channel can cease. This observation gives rise to the observation accelerator circuit shown in FIG. 8, and is based on the duty cycle estimator of FIG. 7.

Figure 8:
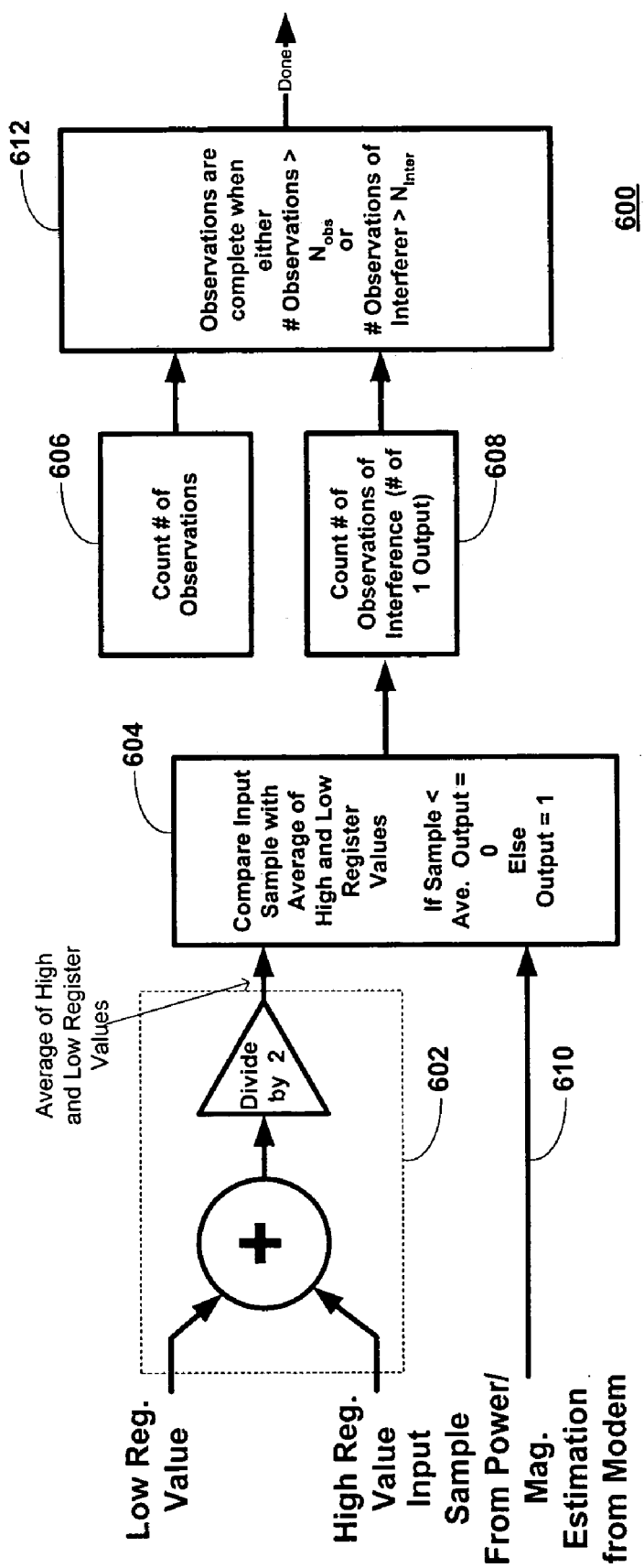
FIG. 8 is a block diagram of an observation accelerator circuit that can be used in implementing the T/R filter blocks shown in the embodiments of FIGS. 1 and 2.

As shown in FIG. 8, the observation accelerator circuit 600 includes an averaging block 602, a comparator block 604, an observation counter 606, an interference counter 608 and an observation complete block 612. The observation accelerator circuit 600 functions as follows. The observation accelerator circuit 600 produces an estimate of whether or not a channel has an interferer present and counts the number of times this occurs. The observation counter 606 maintains a count of the total number of observations made of the channel. The interference counter 608 maintains a count of the total number of interference observations produced by the comparator 604. Each time the comparator 604 outputs a logical one value (the input sample being found to be greater than the average low and high register values), an interference observation is made and the interference counter 608 is incremented by one. Observation of the channels stops when either of two events occurs. If the count of interference hits some predetermined level ($N_{inter}$), or if the total count of observations hits a predetermined level ($N_{obs}$), the observation of that channel stops. The overall observation process is therefore shortened by ensuring that a channel is observed for a duration sufficient to obtain a reasonable estimate of interference levels.

In practice, only a few interference samples are required. The number of interference samples required can be achieved quite rapidly if the duty factor of the interferer is high. However, the value of $N_{obs}$ should be selected to support cases where the duty factor of the interferer is quite low. For example, if it is determined that, on average, five interference observations are required, and duty factors as low as 10% must be supported, the value of $N_{obs}$ should be on the order of 50. If the actual duty factor of the interferer is 75%, then, on average, only seven observations are needed to obtain five interferers. Stopping the observation after five interferers are detected allows the total observation for that channel to be shortened by 43 observations (a saving of 86% in observation time). Even though sampling of the channel is stopped when the desired number of interferers is detected, some noise only samples will also be received. In this case, the noise estimate is updated and any slow changes in noise level are tracked.

The T/R filters (high and low), duty cycle estimator 500, and observation accelerator 600 are utilized during the observation phase of the bad channel assessment process. After the observation phase is completed, all of the noise and interference data required to make a decision regarding interference in the channels has been collected. However, in one embodiment, additional data processing may optionally be performed prior to making a decision about the presence of an interferer. That additional data processing is generation of an average noise estimate. The average noise estimate is performed by the average noise estimation block 10 in the embodiment shown in FIG. 1. No such average noise estimation is performed by the embodiment shown in FIG. 2.

As shown in the embodiment of FIG. 1, the noise estimates maintained and produced by the T/R filter blocks are input to the average noise estimation block 110. The average noise estimation block 110 produces a noise estimate over all the channels (or "average noise estimate"). The average noise estimate produced by the average noise estimation block 110 is input to the interference present decision block 112 via input line 190 (labeled "average noise estimate" in FIG. 1). The average noise estimate is used by interference present decision block 112 to determine whether interference is present on a selected channel.

After the observation period terminates (i.e., after all channels have been observed for a prescribed number of times), the T/R filter block low register outputs (noise estimates) are transmitted to the average noise estimation block 110. As described below in more detail with reference to FIG. 9, in one embodiment, the average noise estimation block 110 produces both a simple arithmetic average and a weighted average of the noise estimates. As compared with embodiments that do not average noise estimates over all the channels, the arithmetic average is a better indication of noise level because the resultant variance is lower. As shown in the embodiment of FIG. 9, the arithmetic noise average can be improved by calculating a weighted noise average, wherein the weighted noise average is produced by rejecting noise estimates that are too high and likely the result of channels having continuous interference.

Figure 9:
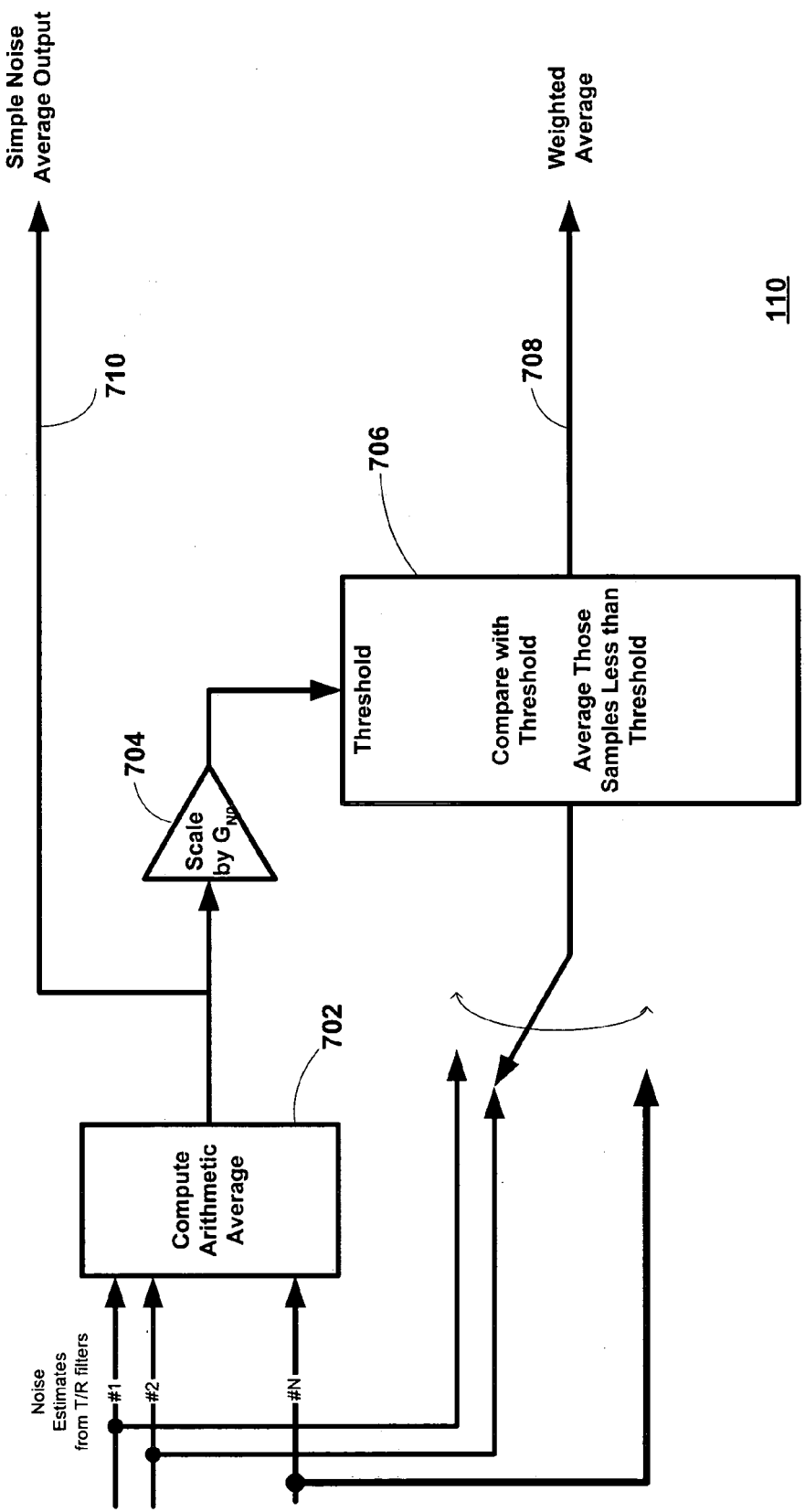
FIG. 9 is a block diagram of one embodiment of the average noise estimation circuit of FIG. 1.

FIG. 9 shows one embodiment of an average noise estimation block 110 that can be used to produce both arithmetic and weighted averages of the noise estimates maintained by the T/R filter blocks. As shown in FIG. 9, the exemplary embodiment of the average noise estimation block 10 includes an arithmetic average calculation block 702, an amplifying stage 704, and a comparator block 706. In accordance with the embodiment shown in FIG. 9, one method for producing weighted averages of the noise estimates is to first compute the arithmetic average of all noise estimates. The arithmetic average calculation block 702 samples the noise estimates contained in each T/R filter block, and computes an arithmetic average of the noise estimates. The arithmetic average of all of the noise samples is scaled by the amplifying stage 704, and compared, by the comparator block 706, to each T/R filter block noise estimate. If the noise estimate is larger than the scaled average, it is likely the result of a continuous interferer and is therefore excluded from the weighted average output by the comparator block 706 on output line 708. Note that, in this case, the simple arithmetic average will be too large due to the inclusion of the continuous interferer interference noise estimates. Because the average noise estimate output by the average noise estimation block 10 is used by the block 112 to compare with the interference estimate, an average noise estimate that is too large will reduce the likelihood of detecting an interferer. Therefore, the weighted average of noise estimates output on output line 708 performs better than the arithmetic average because it rejects noise estimates that are too high and likely the result of channels that have continuous interference.

Referring again to FIG. 1, both the arithmetic and weighted noise averages (output, on output lines 710 and 708 (FIG. 9), respectively) are provided as an "average noise estimate", and input to the interference present decision block 112 for subsequent processing via input line 190.

The final operation to be performed by the inventive method and apparatus is the interference decision process. The interference present decision block 112 shown in FIGS. 1 and 2 performs this decision process. The interference present decision block 112 makes a decision regarding the absence or presence of interference for each channel under investigation. The high register output, corresponding to a selected interference level estimate, is compared to a threshold value. In one embodiment, the threshold value comprises a scaled version of the average noise estimate input via input line 190 (i.e., a scaled version of either the arithmetic or weighted noise average). In one embodiment, the scale factor used to scale the average noise estimate is the same scale factor used for the low T/R filter scaling described above. In this embodiment, the scale factor is of the form $1+\frac{1}{2}^K$. This eliminates the need for a multiplier in the implementation of the interference present decision block 112. If the selected interference estimate is greater than or equal to the threshold value (i.e., greater than or equal to the scaled average noise estimate), the block 112 determines that interference is present on the RF channel associated and corresponding to the selected interference estimate. If not, the block 112 determines that interference is absent.

Alternatively, as shown in FIG. 2, the interference present decision is made by comparing the interference level estimate with the noise level estimate for each channel. FIG. 2 is a simplified high-level block diagram of an alternative embodiment of the interference estimation apparatus that does not include a noise estimate averaging function. In the simplified embodiment 200 of FIG. 2, the presence of interference is based on the noise and interference estimates for each channel. While this is a somewhat simpler implementation than the embodiment 100 shown in FIG. 1, its performance is not as good as the embodiment 100 of FIG. 1.

As shown in FIG. 2, the high register output, corresponding to an interference estimate for a selected channel, is compared to a threshold value. In one embodiment, the threshold value comprises a scaled version of the noise estimate for the selected channel. In one embodiment, the scale factor is the same scale factor used to scale the average noise estimate as described above with reference to FIG. 1. In this embodiment, the scale factor is of the form $1+\frac{1}{2}^K$. In another embodiment, the scale factor is equal to one (i.e., the noise estimate for the selected channel is not scaled). In this embodiment, the interference estimate for the selected channel is compared to the noise estimate for the selected channel. If the selected interference estimate is greater than or equal to the threshold value (i.e., in one embodiment, greater than or equal to the scaled noise estimate for the selected channel), the block 112 determines that interference is present on the selected RF channel. If not, the block 112 determines that interference is absent.

Performance

Figure 10:
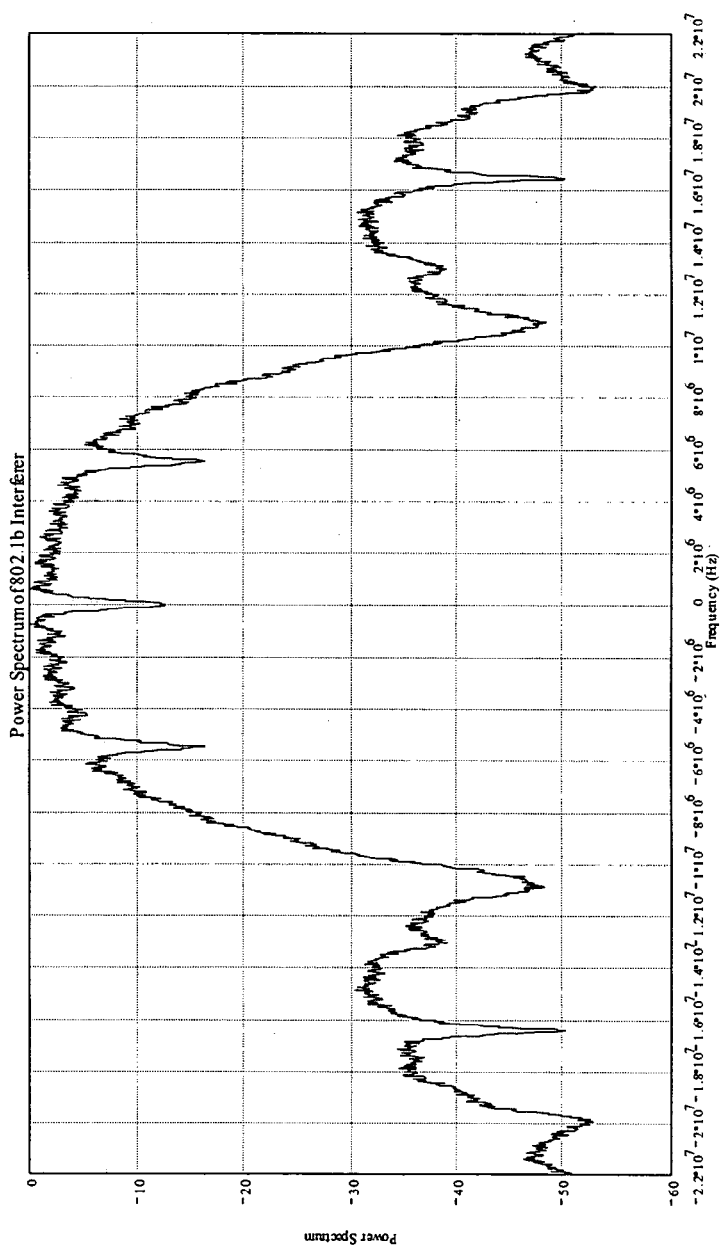
FIG. 10 shows a plot of the power spectrum of an 802.11b Interferer.

The performance of the described embodiments is shown for an interferer consisting of an 802.11b signal with various levels at the receiver. The power spectrum of the interferer is shown in FIG. 10. Each observation was made over 104 usec and 50 observations of each channel were made prior to making a decision about the presence of an interferer. The 802.11b signal is centered on channel forty. The interferer was present 30% of the observations. The embodiment of the T/R filter blocks described above with reference to FIGS. 3 and 4 were used.

Figure 11:
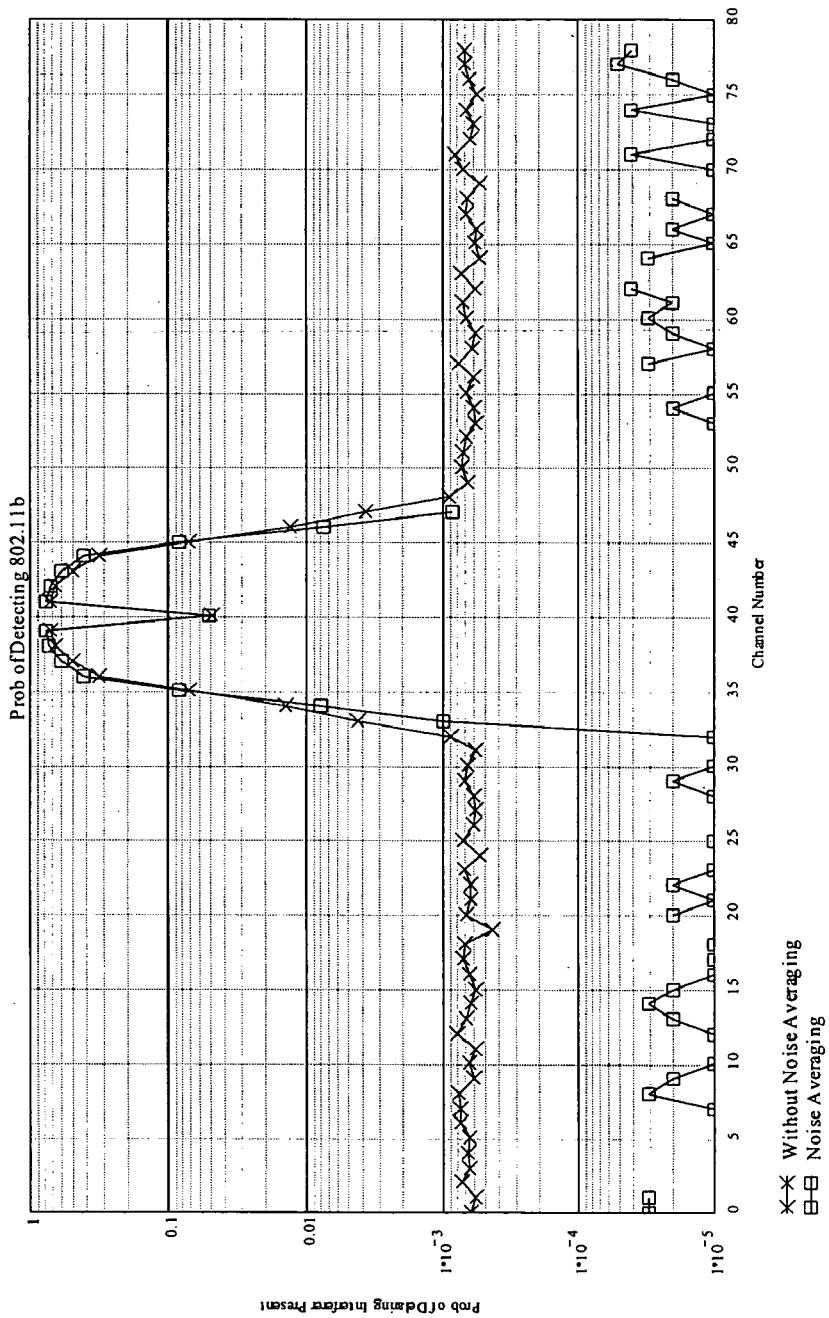
FIG. 11 is a plot showing the probability of detecting the presence of the 802.11b interferer of FIG. 10 when the maximum level of the 802.11b interference signal is just equal to the noise floor.

FIG. 11 shows the probability of detecting the presence of the interferer when the maximum level of the 802.11b signal is just equal to the noise floor. FIG. 11 shows the performance when an averaged noise estimate is used, as well as when the interference is compared only to the noise estimate of that noise channel. Noise averaging reduces the likelihood of erroneously declaring that interference is present by over an order of magnitude while also improving detection probability. Even though the peak signal power is only equal to the noise floor, it still has a very high probability of detection. Comparing FIG. 10 to FIG. 11, it can be observed that the present inventive interference detection method and apparatus detects the 802.11b signal even when it is as much as 5 dB below the noise floor. When the interference is more than 5 dB below the noise floor. It has negligible impact on system performance and therefore would not have to be avoided by the AFH algorithm.

Figure 12:
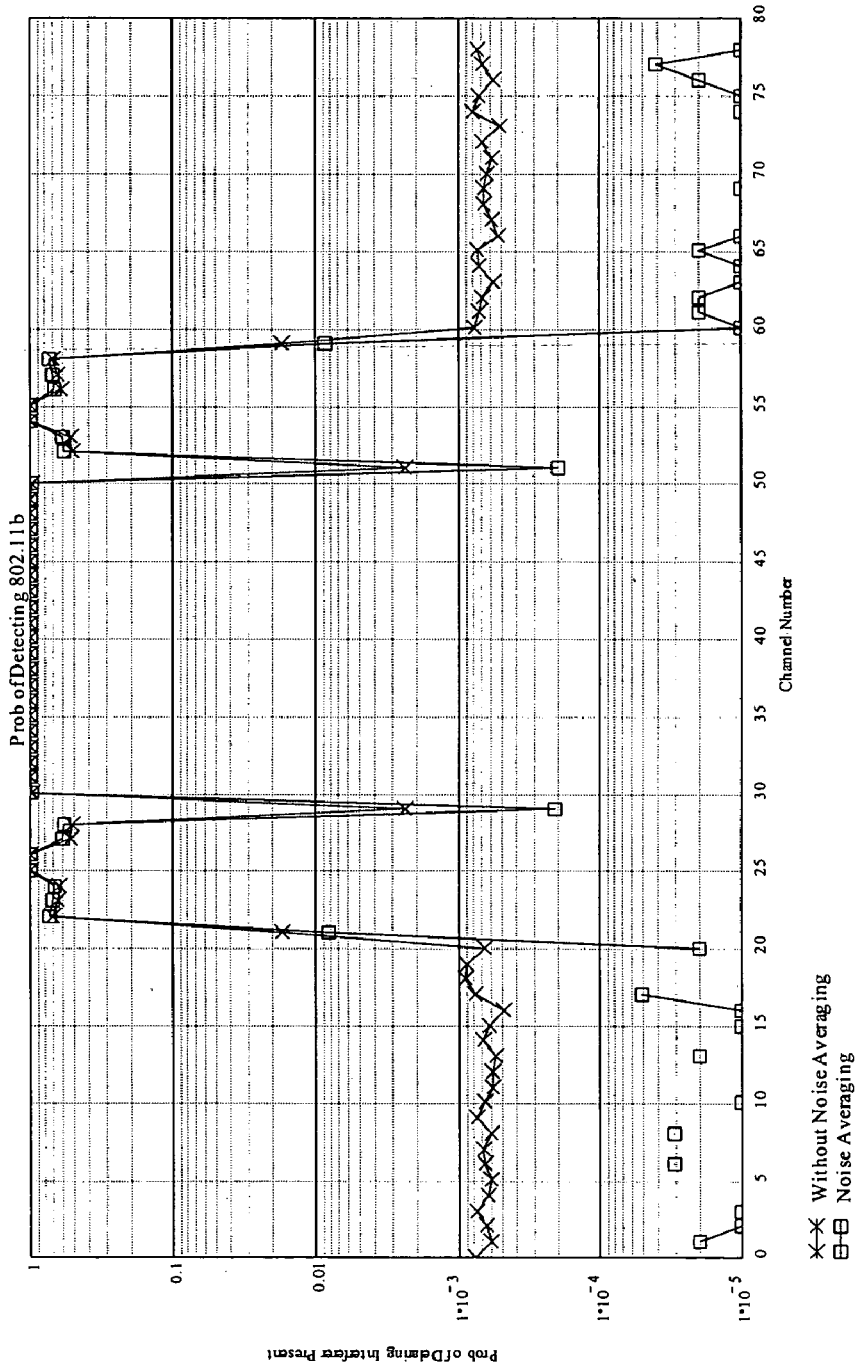
FIG. 12 is a sample plot showing the probability of detecting the presence of the 802.11b interferer of FIG. 10 when the maximum level of the 802.11b interferer signal is 36 dB above the noise floor.

FIG. 12 is a sample plot showing the probability of detecting the presence of the 802.11b interferer of FIG. 10 when the maximum level of the 802.11b interferer signal is 36 dB above the noise floor. Note that the algorithm not only detects the main lobe and side lobes but also detects the notches in the interference spectrum.

Figure 13:
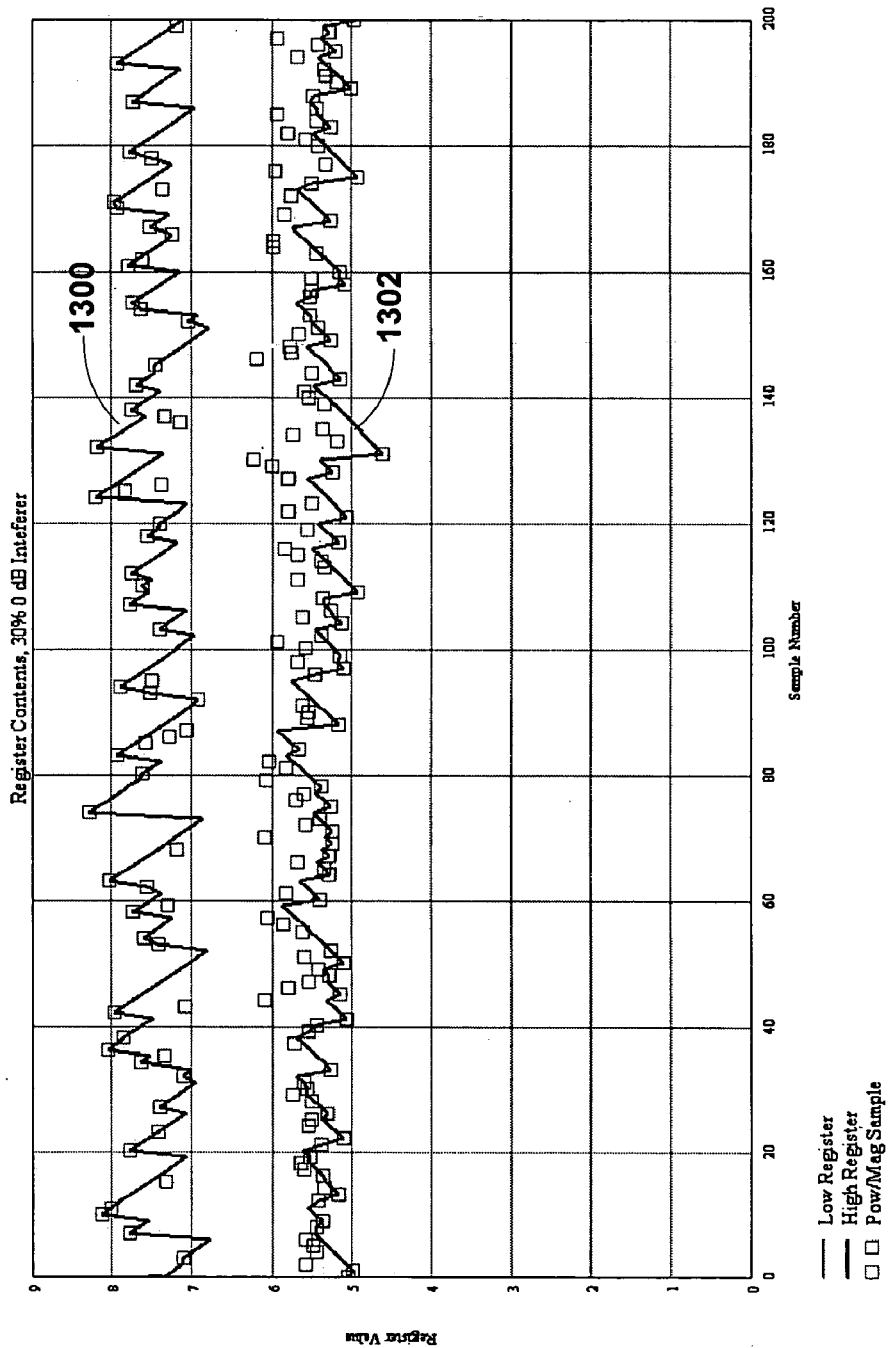
FIG. 13 shows plot lines showing contents of the high and low T/R filters as well as observation samples.

FIG. 13 shows the contents of the high and low T/R filters as well as the observation samples. The example shown in FIG. 13 corresponds to channel forty-one in FIG. 11. The interferer is 0 dB above the noise floor and present in only 30% of the observations. The top plot line 1300 shows a running estimate of the interference. The plot line shows how the value decays over time until a large interferer "resets" the interference estimate. Similarly the noise estimate running value is shown in the lower plot line 1302. The noise estimate 1302 also exhibits similar decay/reset behavior as the interference estimator. FIG. 13 also shows how the interference provides a good estimate of the interference level even though most of the samples do not contain the interference.

Figure 14:
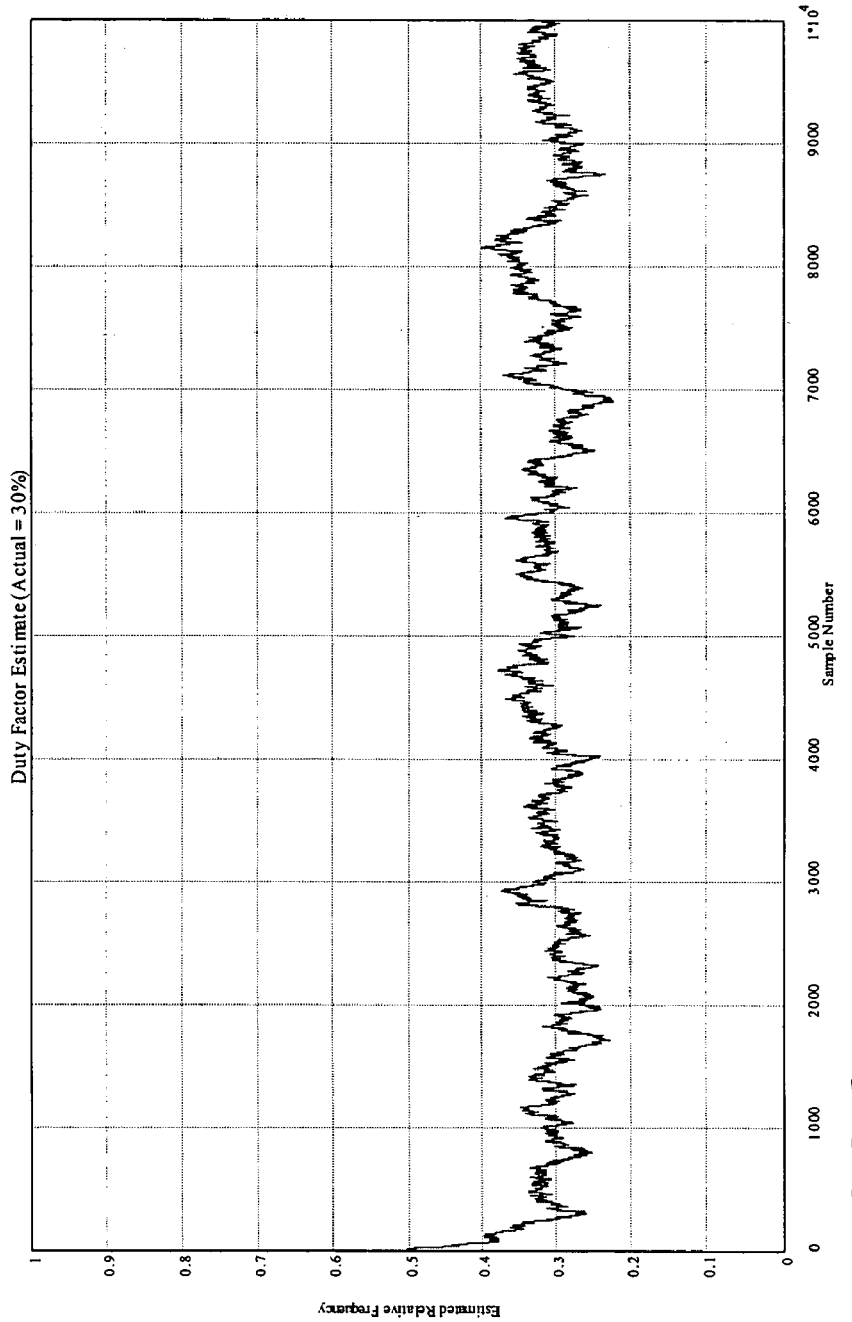
FIG. 14 is a plot showing the performance of the duty factor estimation filter of FIG. 7.

Lastly, FIG. 14 shows the performance of the duty factor estimation filter 500 described above with reference to FIG. 7. The plot shown in FIG. 14 is again for the case where the interferer is at 0 dB of the noise level and has a 30% duty factor. The estimate drops rapidly from the 0.5 preload value and oscillates about the true value of 0.3 (i.e., 30% duty factor).

Control Variables

The present inventive interference detection method and apparatus can be tuned to meet the needs of a particular system by varying several control variables. For example, the probability of interference detection can be varied and traded off against the rate of false alarms being produced. Similarly, the observation time can be shortened versus improvements in both false alarm performance and missed detections. The variables that can be controlled to adjust the performance of the present inventive method and apparatus for determining the presence of interference in a wireless communication link are as follows: Observation length; Number of observations ($N_{obs}$); Number of interference observations ($N_{inter}$); Scale factors for High Register ($G_H$); Scale factor for Low Register ($G_L$); Scale factor for Duty factor ($G_D$); Weighted Noise Average Scale Factor ($G_{N0}$); and the Decision threshold scale factor (T).

The control variables can be tailored to affect the interference detection method and apparatus in a variety of ways. For example, the observation length determines the number of observation phases. Increasing the observation length reduces variance of the noise and interference T/R filter outputs. However, increasing the observation length also increases the amount of time prior to the decision making phase. Thus, the system may be operating on channels that have interference. This number applies to all of the channels used by the system.

The number of observations ($N_{obS}$) variable comprises the number of times a channel must be observed prior to making a decision for a selected channel. This variable is used by the Observation Accelerator 600 (described above with reference to FIG. 8) as one threshold for ending the observation phase of a selected channel. Larger values of $N_{obs}$ reduce the variance of the interference and noise filter outputs but increases the time prior to decision making.

The number of interference observations ($N_{inter}$) variable can be used by the Observation Accelerator 600 as yet another means for limiting observation time for a selected channel. The variable $N_{inter}$ counts a number of times that an interferer is observed on a selected channel. After interference is observed a relatively small number of times on a selected channel, the selected channel can reliably be determined to be of low quality due to the detected interference. If the interferer has a high duty cycle, the observation phase can be exited sooner (instead of waiting until the number of sample observations indicated by the variable $N_{obs}$ is taken). Increasing the value of the variable $N_{inter}$ can result in the Observation Accelerator 600 exiting only after $N_{obS}$ sample observations are taken, thus increasing the time spent in the observation phase. This is especially true when the interferer has a low duty cycle.

The scale factor for High Register ($G_H$) variable controls the rate of decay of the interference level estimate. Increasing the variable $G_H$ slows the rate of decay of the value in High Register which reduces the variance of the interference level estimate. However, it also slows the reaction time if the interference level decreases. The scale factor for Low Register ($G_L$) variable controls the rate of decay of the noise level estimate. Increasing the variable $G_L$ slows the rate of decay of the value in Low Register which reduces the variance of the noise level estimate. However, it also slows the reaction time if the noise level increases.

The Scale Factor for Duty Factor variable ($G_D$) is used by the Duty Cycle Estimation filter 500 (described above with reference to FIG. 7). This variable modifies the bandwidth of the filtering block 506. Decreasing the $G_D$ variable reduces the bandwidth of the filtering block 506 and the variance of the duty factor estimate. However, decreasing the $G_D$ variable also increases the time it takes for the filter to respond to a change in duty factor.

The Weighted Noise Average Scale Factor variable ($G_{N0}$) is used by the average noise estimation block 110 (described above with reference to FIG. 1). This variable sets the level of noise samples used to determine the weighted noise average compared to the average of all noise samples. Reducing variable $G_{N0}$ has the effect of increasing the probably of excluding a low level, continuous interferer from the noise average. However, reducing this variable also lowers the overall noise estimate. Consequently, reducing $G_{N0}$ also very slightly increases the probability that a selected channel will be erroneously determined as having interference when the selected channel, in actuality, simply has a greater noise level.

The Decision Threshold Scale Factor (T) is used during the decision making phase. The decision threshold scale factor T determines how much larger the interference estimate must be than the noise estimate before a channel is determined to have interference present (rather than noise only). Reducing the T variable increases the probability of correctly deciding that interference is present. However, reducing the value of T also increases the probability that a channel with noise only will be erroneously determined to have an interferer present.

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order, except for those embodiments described in a claim that include a specified order for the steps.

Accordingly, it is to be understood that the invention is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. An interference detection apparatus for use in a wireless communication system, wherein the wireless communication system includes a plurality of radio frequency (RF) channels transmitting RF signals, and wherein the interference detection apparatus detects the presence of interference in a selected RF channel, comprising:

(a) a radio/modem device adapted to receive the RF signals, wherein the radio/modem is responsive to channel control signals that select one of the plurality of RF channels, and wherein the radio/modem produces a received signal strength indication (RSSI) measurement corresponding to the RF signals present on a selected RF channel;

(b) a plurality of tracking/register (T/R) filter blocks, switchably coupled to the radio/modem device, wherein each T/R filter block is associated with and corresponds to a unique RF channel, and wherein each T/R filter block receives an RSSI measurement from the radio/modem for its associated and corresponding RF channel, and wherein each T/R filter block produces and maintains noise and interference estimates for its corresponding and associated RF channel;

(c) an average noise estimation block, coupled to the plurality of T/R filter blocks, and capable of receiving the noise estimates stored in the T/R filter blocks, wherein the average noise estimation block outputs an average noise estimate of all of the noise estimates stored in the plurality of T/R filter blocks; and (d) an interference present decision block, switchably coupled to the plurality of T/R filter blocks and adapted to receive the average noise estimate from the average noise estimation block, wherein the interference present decision block outputs an interference present indication for a selected RF channel if the interference estimate stored in its associated and corresponding T/R filter block exceeds the average noise estimate by a threshold value.

2. The interference detection apparatus of claim 1, wherein the RSSI measurement produced by the radio/modem device is proportional to received power or magnitude of the corresponding RF signal.

3. The interference detection apparatus of claim 1, wherein the RSSI measurement produced by the radio/modem device comprises a magnitude estimate based on in-phase (I) and quadrature (Q) outputs of an analog-digital (A/D) converter.

4. The interference detection apparatus of claim 1, wherein the A/D converter comprises a Delta Sigma Modulator.

5. The interference detection apparatus of claim 3, wherein the magnitude estimate is produced in accordance with the following equation:

$$\text{Metric} = \sum_N \left( \max(|I|, |Q|) + \frac{1}{2}\min(|I|, |Q|) \right).$$

6. The interference detection apparatus of claim 3, wherein the magnitude estimate is produced in accordance with the following equation:

$$\text{Metric} = \sum_N \sqrt{I^2 + Q^2}.$$

7. The interference detection apparatus of claim 1, wherein the RSSI measurement produced by the radio/modem device comprises a power estimate based on in-phase (I) and quadrature (Q) outputs of a Delta Sigma Modulator.

8. The interference detection apparatus of claim 1, wherein the power estimate is produced in accordance with the following equation:

$$\text{Metric} = \sum_N (I^2 + Q^2),$$

and wherein N comprises the number of samples taken during an observation period.

9. The interference detection apparatus of claim 1, wherein the RSSI measurements produced by the radio/modem device are input to the T/R filter blocks during an observation/data collection phase of a bad channel assessment algorithm.

10. The interference detection apparatus of claim 1, wherein the T/R filter blocks comprise:
   (a) a low value T/R filter, wherein the low value T/R filter tracks noise in a corresponding and associated channel; and
   (b) a high value T/R filter, wherein the high value T/R filter tracks interference in a corresponding and associated channel.

11. The interference detection apparatus of claim 10, wherein the low value T/R filter comprises:
   (a) a comparator block, having a first and second input and an output, wherein the first input is coupled to receive the RSSI measurement from the radio/modem device;
   (b) a multiplexer, having a first and second input and an output, and having a selection input coupled to the output of the comparator, wherein the first multiplexer input is coupled to receive the RSSI measurement;
   (c) a low register, having an input and an output, wherein the input is coupled to the output of the multiplexer, and wherein the low register output is coupled to the second input of the comparator block; and
   (d) an amplifier, having an input coupled to receive the output of the low register, and having an output coupled to the second input of the multiplexer;
wherein the low value T/R filter tracks noise in a corresponding channel by inputting an RSSI measurement during an observation phase, comparing the inputted measurement to contents of the low register, and loading the low register with the inputted RSSI measurement if it is lower than the contents, else loading the low register with an amplified version of the low register contents, as amplified by the amplifier.

12. The interference detection apparatus of claim 11, wherein the amplifier has a scale factor slightly greater than unity.

13. The interference detection apparatus of claim 12, wherein the scale factor provided by the amplifier is of the form $1+\frac{1}{2}^K$.

14. The interference detection apparatus of claim 12, wherein variations in the scale factor control an amount of decay in the low register contents.

15. The interference detection apparatus of claim 10, wherein the high value T/R filter comprises:
   (a) a comparator block, having a first and second input and an output, wherein the first input is coupled to receive the RSSI measurement from the radio/modem device;
   (b) a multiplexer, having a first and second input and an output, and having a selection input coupled to the output of the comparator, wherein the first multiplexer input is coupled to receive the RSSI measurement;
   (c) a high register, having an input and an output, wherein the input is coupled to the output of the multiplexer, and wherein the high register output is coupled to the second input of the comparator block; and
   (d) an amplifier, having an input coupled to receive the output of the high register, and having an output coupled to the second input of the multiplexer;
wherein the high value T/R filter tracks noise in a corresponding channel by inputting an RSSI measurement during an observation phase, comparing the inputted measurement to contents of the high register, and loading the high register with the inputted RSSI measurement if it is greater than the contents, else loading the high register with an amplified version of the high register contents, as amplified by the amplifier.

16. The interference detection apparatus of claim 15, wherein the amplifier has a scale factor slightly less than unity.

17. The interference detection apparatus of claim 16, wherein the scale factor provided by the amplifier is of the form $1-\frac{1}{2}^K$.

18. The interference detection apparatus of claim 10, wherein the low value T/R filter comprises:
   (a) a comparator block, having a first and second input and an output, wherein the first input is coupled to receive the RSSI measurement from the radio/modem device;
   (b) a low register, having an input and an output, wherein the input is coupled to the comparator block output; and
   (c) an amplifier, having an input coupled to receive the output of the low register, and having an output coupled to the second input of the comparator;
wherein the low value T/R filter tracks noise in a corresponding channel by inputting an RSSI measurement during an observation phase, comparing the inputted measurement to amplified contents of the low register, as amplified by the amplifier, and loading the low register with the inputted RSSI measurement if it is lower than the amplified contents, else loading the low register with the amplified contents.

19. The interference detection apparatus of claim 18, wherein the amplifier has a scale factor slightly greater than unity.

20. The interference detection apparatus of claim 19, wherein the scale factor provided by the amplifier is of the form $1+\frac{1}{2}^K$.

21. The interference detection apparatus of claim 19, wherein variations in the scale factor control an amount of decay in the low register contents.

22. The interference detection apparatus of claim 10, wherein the high value T/R filter comprises:
   (a) a comparator block, having a first and second input and an output, wherein the first input is coupled to receive the RSSI measurement from the radio/modem device;
   (b) a high register, having an input and an output, wherein the input is coupled to the comparator block output; and
   (c) an amplifier, having an input coupled to receive the output of the high register, and having an output coupled to the second input of the comparator;
wherein the high value T/R filter tracks noise in a corresponding channel by inputting an RSSI measurement during an observation phase, comparing the inputted measurement to amplified contents of the high register, as amplified by the amplifier, and loading the high register with the inputted RSSI measurement if it is greater than the amplified contents, else loading the high register with the amplified contents.

23. The interference detection apparatus of claim 22, wherein the amplifier has a scale factor slightly less than unity.

24. The interference detection apparatus of claim 23, wherein the scale factor provided by the amplifier is of the form $1-\frac{1}{2}^K$.

25. The interference detection apparatus of claim 10, wherein the T/R filter blocks further include a duty cycle estimation filter, wherein the duty cycle estimation filter estimates a probability that an interferer is present in a selected channel.

26. The interference detection apparatus of claim 25, wherein the duty cycle estimation filter comprises:
  (a) an averaging block, adapted to receive noise data from the low value T/R filter and interference data from the high value T/R filter, wherein the averaging block outputs a computed average of the noise and interference data;
  (b) a comparator block, having a first input coupled to receive the computed average output by the averaging block, and a second input coupled to receive the RSSI measurement, and wherein the comparator block also has an output; and
  (c) an integrator block, wherein the integrator block is coupled to receive the comparator block output;
and wherein the comparator block compares the computed average with the RSSI measurement and outputs a logical one value if the RSSI measurement is greater than the computed average, else the comparator block outputs a logical zero, and wherein the integrator block outputs a value that is approximately equal to a probability that an interferer is present on a selected channel.

27. The interference detection apparatus of claim 26, wherein the computed average comprises an average of the high and low register contents over several observation periods.

28. The interference detection apparatus of claim 26, wherein the computed average comprises a weighted average of noise and interference measurements.

29. The interference detection apparatus of claim 26, wherein the averaging block uses a scaled version of the noise data to produce the computed average.

30. The interference detection apparatus of claim 10, further including an observation accelerator circuit comprising:
  (a) an averaging block, adapted to receive noise data from the low value T/R filter and interference data from the high value T/R filter, wherein the averaging block outputs a computed average of the noise and interference data;
  (b) a comparator block, having a first input coupled to receive the computed average output by the averaging block, and a second input coupled to receive the RSSI measurement, and wherein the comparator block also has an output;
  (c) an interference observation counter, having an input coupled to the comparator block output, and having an output, wherein the interference counter maintains a count of the number of interference measurements found in a selected channel;
  (d) an observation counter, adapted to maintain a count of the number of observations made of the selected channel, wherein the observation counter has an output; and
  (e) an observation completion block, coupled to receive the outputs of both the interference observation counter and the observation counter,
wherein observation of the selected channel ceases if either the interference observation counter equals a predetermined interference threshold value ($N_{inter}$) or the observation counter equals a predetermined total observation count value ($N_{obs}$).

31. The interference detection apparatus of claim 1, wherein the average noise estimation block comprises:
  (a) an arithmetic average calculation block, having an input and an output, wherein the arithmetic average calculation block is adapted to receive noise data from each low value T/R filter, wherein the arithmetic average calculation block produces a computed average of the noise data;
  (b) a comparator block, having a first input switchably coupled to selectively receive noise data from each low value T/R filter, and having a second input, and wherein the comparator block also has an output; and
  (c) an amplifier, having an input coupled to the output of the arithmetic average calculation block, and having an output coupled to the second input of the comparator block,
wherein the computed average of all T/R filter noise data is scaled by the amplifier, and compared to the noise data of a selected T/R filter, and wherein if the selected T/R filter noise exceeds the scaled computed average, the selected T/R filter noise is excluded from the weighted average noise estimate output by the comparator block.

32. The interference detection apparatus of claim 1, wherein the average noise estimate comprises a simple arithmetic average of all of the noise estimates stored in the plurality of T/R filter blocks.

33. The interference detection apparatus of claim 1, wherein the average noise estimate comprises a weighted average of all of the noise estimates stored in the plurality of T/R filter blocks.

34. The interference detection apparatus of claim 1, wherein the interference present decision block scales the average noise estimate to produce a scaled average noise estimate, and wherein the interference present decision block compares the interference estimate stored in a selected T/R filter block with the scaled average noise estimate, and outputs an interference present indication for its associated and corresponding RF channel if the interference estimate is equal to or greater than the scaled average noise estimate.

35. The interference detection apparatus of claim 34, wherein the scaled average noise estimate is obtained by scaling the average noise estimate by a factor of $1+\frac{1}{2}^K$.

36. An interference detection apparatus for use in a wireless communication system, wherein the wireless communication system includes a plurality of radio frequency (RF) channels transmitting RF signals, and wherein the interference detection apparatus detects the presence of interference in a selected RF channel, comprising:
  (a) a radio/modem device adapted to receive the RF signals, wherein the radio/modem is responsive to channel control signals that select one of the plurality of RF channels, and wherein the radio/modem produces a received signal strength indication (RSSI) measurement corresponding to the RF signals present on a selected RF channel;
  (b) a plurality of tracking/register (T/R) filter blocks, switchably coupled to the radio/modem device, wherein each T/R filter block is associated with and corresponds to a unique RF channel, and wherein each T/R filter block receives an RSSI measurement from the radio/modem for its associated and corresponding RF channel, and wherein each T/R filter block produces and maintains noise and interference estimates for its corresponding and associated RF channel; and (c) an interference present decision block, switchably coupled to the plurality of T/R filter blocks, wherein the interference present decision block compares the interference estimate of the selected T/R filter block with a threshold value and outputs an interference present indication for its associated and corresponding RF channel if the interference estimate is equal to or greater than the threshold value.

37. The interference detection apparatus of claim 36, wherein the threshold value comprises the noise estimate stored in the selected T/R filter block.

38. The interference detection apparatus of claim 36, wherein the threshold value comprises a scaled version of the noise estimate stored in the selected T/R filter block.

39. The interference detection apparatus of claim 38, wherein the scaled version of the noise estimate stored in the selected T/R filter block is obtained by scaling the noise estimate by a factor of $1+\frac{1}{2}^K$.

40. An interference detection apparatus for use in a wireless communication system, wherein the wireless communication system includes a plurality of radio frequency (RF) channels transmitting RF signals, and wherein the interference detection apparatus detects the presence of interference in a selected RF channel, comprising:

(a) means for producing a received signal strength indication (RSSI) measurement corresponding to the RF signals present on a selected RF channel, wherein the RSSI measurement producing means is adapted to receive the RF signals, and wherein the RSSI measurement producing means is responsive to channel control signals that select one of the plurality of RF channels;

(b) a plurality of tracking/register (T/R) filtering means for tracking noise and interference levels in corresponding and associated RF channels, wherein the T/R filtering means are switchably coupled to the RSSI measurement producing means, and wherein each T/R filtering means is associated with and corresponds to a unique RF channel, and wherein each T/R filtering means inputs an RSSI measurement for its associated and corresponding RF channel, and wherein each T/R filtering means maintains noise and interference estimates for its associated and corresponding RF channel;

(c) means, coupled to the plurality of T/R filtering means, for calculating an average noise estimate of all of the noise estimates maintained by the plurality of T/R filtering means; and (d) means, switchably coupled to the plurality of T/R filtering means and coupled to the average noise estimate calculating means, for determining presence of interference in a selected RF channel, wherein the interference presence determining means compares the interference estimate, stored in the T/R filtering means associated and corresponding to the selected RF channel, to the average noise estimate and outputs an interference present indication for the selected RF channel if the interference estimate exceeds the average noise estimate by a threshold value.

41. The interference detection apparatus of claim 40, wherein the average noise estimate comprises a simple arithmetic average of all of the noise estimates stored in the plurality of T/R filtering means.

42. The interference detection apparatus of claim 40, wherein the average noise estimate comprises a weighted average of all of the noise estimates stored in the plurality of T/R filtering means.

43. The interference detection apparatus of claim 40, wherein the interference presence determining means scales the average noise estimate to produce a scaled average noise estimate, and wherein the interference presence determining means compares the interference estimate stored in a selected T/R filtering means with the scaled average noise estimate and outputs an interference present indication for its associated and corresponding RF channel if the interference estimate is equal to or greater than the scaled average noise estimate.

44. An interference detection apparatus for use in a wireless communication system, wherein the wireless communication system includes a plurality of radio frequency (RF) channels transmitting RF signals, and wherein the interference detection apparatus detects the presence of interference in a selected RF channel, comprising:

(a) means for producing a received signal strength indication (RSSI) measurement corresponding to the RF signals present on a selected RF channel, wherein the RSSI measurement producing means is adapted to receive the RF signals, and wherein the RSSI measurement producing means is responsive to channel control signals that select one of the plurality of RF channels;

(b) a plurality of tracking/register (T/R) filtering means for tracking noise and interference levels in corresponding and associated RF channels, wherein the T/R filtering means are switchably coupled to the RSSI measurement producing means, and wherein each T/R filtering means is associated with and corresponds to a unique RF channel, and wherein each T/R filtering means inputs an RSSI measurement for its associated and corresponding RF channel, and wherein each T/R filtering means maintains noise and interference estimates for its associated and corresponding RF channel; and (c) means, switchably coupled to the plurality of T/R filtering means, for determining presence of interference in a selected RF channel, wherein the interference presence determining means compares the interference estimate of a selected T/R filtering means with a threshold value and outputs an interference present indication for its associated and corresponding RF channel if the interference estimate is equal to or greater than the threshold value.

45. The interference detection apparatus of claim 44, wherein the threshold value comprises the noise estimate stored in the selected T/R filtering means.

46. The interference detection apparatus of claim 44, wherein the threshold value comprises a scaled version of the noise estimate stored in the selected T/R filtering means.

* * * * *